E. A. HAWTHORNE.
VEHICLE LAMP.
APPLICATION FILED JUNE 26, 1916.
1,218,766.
Patented Mar. 13, 1917.
2 SHEETS—SHEET 1.
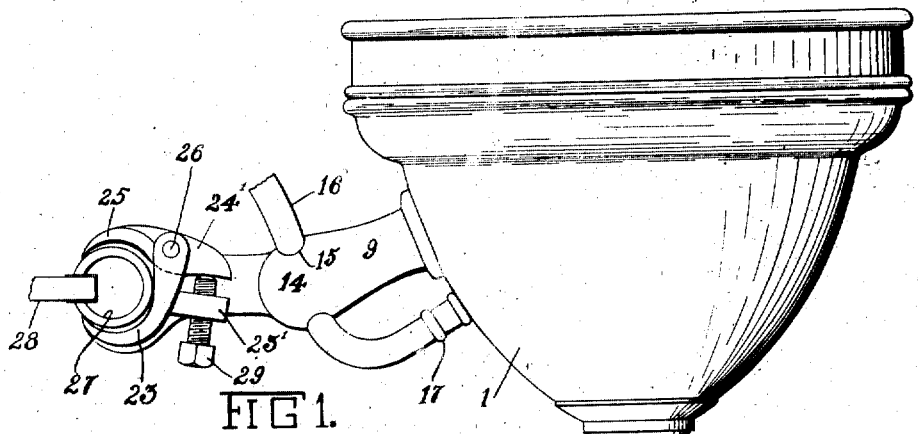
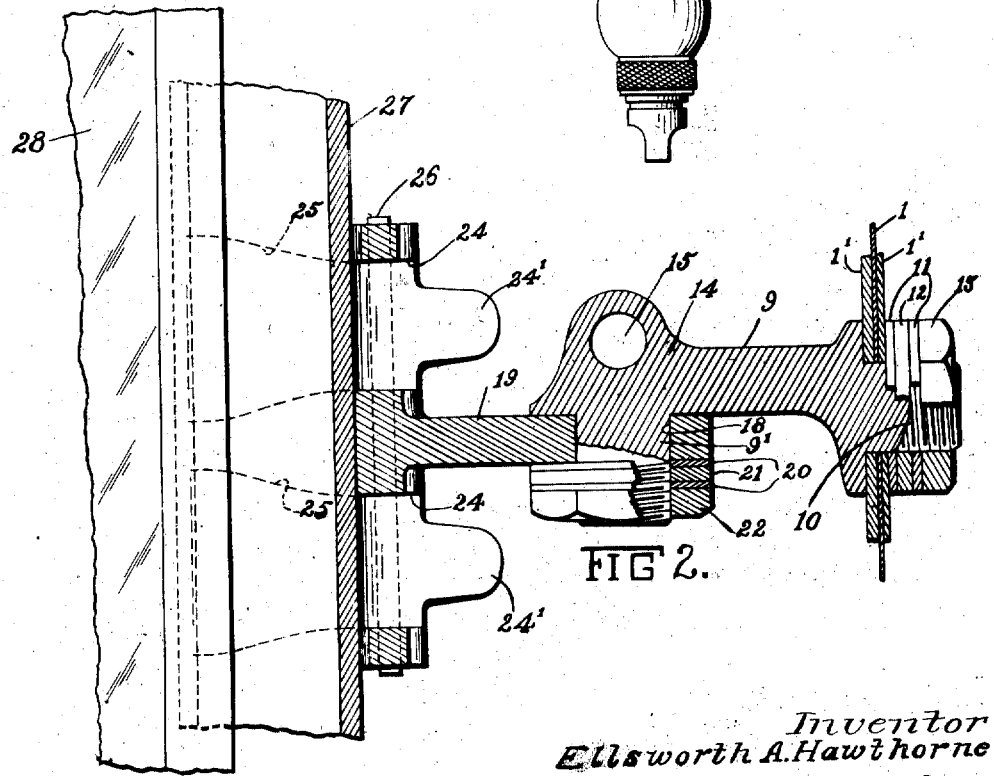
Inventor
Ellsworth A. Hawthorne
By
Attorney

E. A. HAWTHORNE.
VEHICLE LAMP.
APPLICATION FILED JUNE 26, 1916.

1,218,766.

Patented Mar. 13, 1917
2 SHEETS—SHEET 2.

Inventor
Ellsworth A. Hawthorne

By
Attorney

UNITED STATES PATENT OFFICE.

ELLSWORTH A. HAWTHORNE, OF BRIDGEPORT, CONNECTICUT.

VEHICLE-LAMP.

1,218,766.

Specification of Letters Patent.

Patented Mar. 13, 1917.

Application filed June 26, 1916. Serial No. 105,786.

*To all whom it may concern:*

Be it known that I, ELLSWORTH A. HAWTHORNE, a citizen of the United States, residing at Bridgeport, county of Fairfield, State of Connecticut, have invented certain new and useful Improvements in Vehicle-Lamps, of which the following is a specification.

This invention relates to vehicle lights of the class known as spotlights, and which are adapted to be clamped to the windshield or at any other convenient place on an automobile or other vehicle in such adjustable relation thereto that it may be manipulated to project a beam of light in any desired direction.

The objects of my invention are to provide a bracket which will allow the lamp universal movement with relation to the windshield; to provide a bracket which may be accommodated to windshields having tubing of various diameters and varying tapers; and to provide a bracket which will not flatten out the windshield tubing when clamped thereto.

These and certain other features which will appear more fully hereinafter are secured in the device of the present invention. In carrying out my invention, I provide a bracket consisting of two overlapping arms pivotally connected to each other and capable of relative turning movement about a horizontal axis at said pivot. The free end of one arm has a swiveled connection with the lamp to allow the lamp turning movement about a vertical axis, and the free end of the other arm carries my special windshield clamping device.

This clamp consists of an appropriately curved clamping jaw rigid with said arm, and a pair of spaced independently adjustable jaws pivoted to and overlying said fixed jaw. The rigid jaw has two spaced lugs through which set screws are mounted and the pivoted jaws have each a lug overlying one of the lugs of the fixed jaw and against which the set screws work. The independent screws therefore, not only allow the pivoted jaws to be independently adjusted so as to fit windshield tubing of various diameters and varying tapers, but these set screws operate directly against the lugs of the pivoted jaws instead of against the windshield tubing itself. Where the set screws have operated directly against the windshield tubing the pressure necessary to lock the clamping member on the windshield tubing causes the screws to flatten out the tubing, thereby inserting a depression therein, which eventually allows the lamp to move and rattle under the vibration of the automobile.

The construction and operation of my device is fully described in the specification which follows. In the drawings accompanying that specification I have shown an embodiment which has been found satisfactory in use and well adapted to the requirements of manufacture. Throughout this specification and in the drawings like reference numerals are applied to indicate corresponding parts, and in the drawings:

Figure 1 is a plan view of a spotlight equipped with my bracket and applied to a windshield.

Fig. 2 is a vertical central section through the bracket and windshield tubing.

Figure 3:
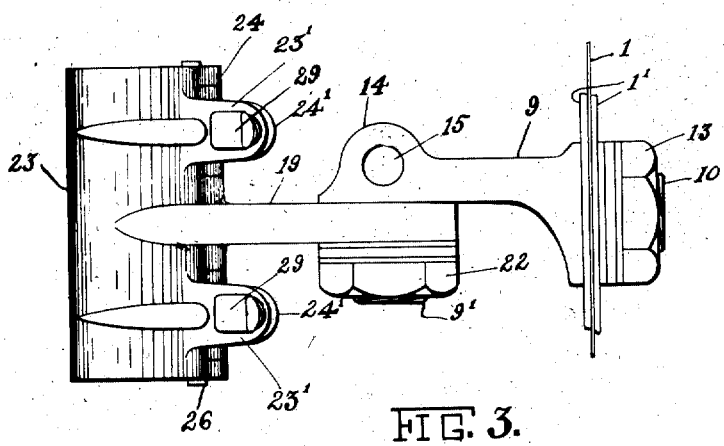
Figs. 3 and 4 are views of opposite sides of the bracket and particularly illustrating the windshield clamping device.
Figure 4:
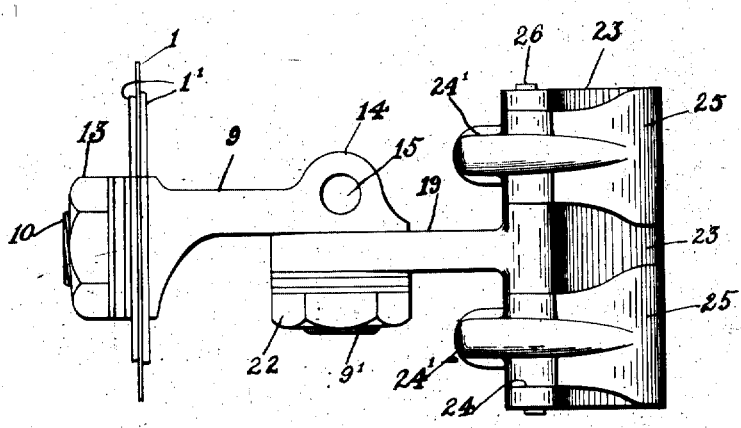

The lamp supporting bracket of my invention allows the lamp 1 universal adjusting movement with relation to the windshield. Said bracket consists of a horizontal arm 9 having one end formed as a reduced threaded portion 10 extended through the outside and inside reinforcing shells $1^1$ of the lamp casing 1 and held by a pair of plain washers 11, a lock washer 12 and a check nut 13. This allows the lamp turning movement about a horizontal axis. The opposite end of the arm is enlarged as indicated at 14 and has a transverse hole 15 therein adapted to receive and conduct the feed cable 16 of the lamp therethrough. The feed cable enters the lamp casing at a point below the connection of the arm 9, and is there provided with a suitable rubber or other protector 17. Below the enlargement 14 the lamp carrying arm 9 is reduced and threaded and extends downwardly as a stud portion $9^1$ which passes through a hole 18 in the outer end of an underlying clamp carrying arm 19, being held to said arm by a pair of plain washers 20, a lock washer 21 and a check nut 22 threaded on said extension $9^1$. The extension $9^1$ therefore allows the lamp movement about a vertical axis.

The opposite end of the clamp arm 19 is formed as a downwardly extending appropriately curved casting 23 constituting the fixed jaw of the windshield clamp. The casting 23 is slotted on each side of its connection with the arm 19, as indicated at 24—24 to receive a pair of independently adjustable jaws 25 which are pivoted on a suitable pintle 26 extending through said slots longitudinally of the casting 23, and substantially parallel to the tubing 27 of the windshield 28. The purpose of the two sets of clamping members is to permit the jaws to be so positioned as to accommodate themselves to windshield tubings of different diameters and of different tapers. The casting 23 has a pair of horizontally extending lugs 23¹ and the pivoted jaws 25 have similarly disposed lugs 24¹ overlying the lugs 23¹ and through which pass independent set screws 29, whereby to hold the adjustments of the jaws.

My clamp may therefore be attached to windshield tubing of various diameters and by reason of the independence of action between the jaws, the jaws may be fitted to tubing of varying tapers as well as varying diameters. Moreover, the set screws operate against the lugs 24¹ of the adjustable jaws, instead of against the windshield tubing itself, so that they may be set up with any amount of pressure necessary to hold them without bearing against and flattening out the tubing. This obviates the formation of a depression in the tubing and a consequent development of a play sufficient to permit the lamp to rattle under the vibration of the automobile.

Various modifications in the form and construction of my invention may obviously be resorted to if within the limits of the appended claims.

What I therefore claim and desire to secure by Letters Patent is:

1. A clamp comprising an arm having a fixed jaw, a pair of independently adjustable jaws operatively connected with said fixed jaw, and a pair of independently operable members carried by said fixed jaw and operating each against one of said movable jaws for independently adjusting said movable jaws to thereby adapt the clamp to supports of varying cross section.

2. Means for connecting a lamp to supports of various sections, comprising an arm having a substantially vertical end wall of hook-shaped cross-section to form a seat for the support, lugs on the back of said wall, spaced hinge-like bearings at one edge of the wall, independent clamp-leaves pivoted in said bearings, screws in said lugs for closing the leaves on the support, and an arm pivoted on the clamp arm, and upon which the lamp is turnably mounted.

3. A clamp and hanger for lamps, comprising an elongated main hinge-like leaf with a concaved face forming a seat for a support to which the clamp may be attached, one edge of the leaf having spaced bearings, a pintle therein, independent leaves on said pintle and having ears projecting rearwardly thereof, lugs on the back of the elongated leaf, screws in said lugs for acting on the ears of the pivoted leaves, and an arm projecting rearwardly from the intermediate portion of the main leaf and to which a lamp is connectible for universal movement.

4. A clamp comprising an arm terminating in a downwardly extending curved fixed jaw, a pair of spaced lugs extending rearwardly from said jaw, a pair of independently adjustable curved jaws pivoted near one end of said fixed jaw at opposite sides of said arm, a lug extending rearwardly beyond the pivot of each adjustable jaw, and overlying said pair of lugs, and a set screw engaging each pair of overlying lugs for independently adjusting said pivoted jaws to supports of varying cross-section.

5. A bracket for mounting a lamp in universally adjustable relation to a support comprising offset parallel lamp and clamp carrying arms pivotally connected with each other at their overlapping ends, a headed stud on said lamp carrying arm adapted to be fitted in a lamp, and a clamp on said clamp carrying arm adapted to adjustably engage the tubing of the windshield to accommodate the bracket to variations in the cross-section of the tubing.

6. A bracket for mounting a lamp in universally adjustable relation on a windshield comprising a laterally disposed arm having one end disposed in the plane of the arm, and reduced and threaded for swivel connection with the lamp and having its opposite end disposed transversely to the plane of the arm and reduced and threaded for swivel connection with a windshield engaging arm, and a windshield engaging arm disposed below said lamp carrying arm and parallel thereto and carrying a windshield clamping device at its free end.

7. A bracket for mounting a lamp in universally adjustable relation on a support, comprising a lamp carrying arm adapted to be attached to a lamp at one end and having a solid perpendicular stud or projection on its other end provided with a guide opening for the reception of the feed wires of the lamp, a clamp carrying arm extending parallel to said lamp carrying arm and having a clamp at one end adapted to engage the support, and having its other end formed with an opening therethrough for the reception of the stud or projection on said lamp carrying arm.

8. In combination with a lamp having an aperture therein, a bracket for adjustably mounting said lamp upon a suitable support including an arm adapted to be operatively connected to said support and having one end reduced and threaded for insertion through the aperture of the lamp; and a plain bearing element, a lock device, and a check nut threaded on said reduced extension from within the lamp casing and providing a joint allowing said lamp turning movement about said arm as an axis.

9. A clamp for use upon supports of varying cross section and external configuration, comprising a fixed jaw and a pair of independently movable jaws pivotally connected with said fixed jaw, and means for independently adjusting said movable jaws to adapt the clamp to supports of varying cross section.

10. A clamp for use upon supports of varying cross section, comprising a relatively fixed jaw and a pair of independently movable jaws pivotally connected with said fixed jaw, and means operating directly against said movable jaws for independently adjusting them to adapt the clamp to supports of varying cross section.

11. A clamp for use upon supports of varying cross section, comprising a relatively fixed jaw and a pair of independent duplicate movable jaws pivotally connected with said fixed jaw and together spanning an area substantially equal to the area spanned by the fixed jaw, and means for independently adjusting said movable jaws to adapt the clamp to supports of varying cross section.

In testimony whereof I affix my signature in presence of two witnesses.

ELLSWORTH A. HAWTHORNE.

Witnesses:
E. HORACE HAWTHORNE,
E. STEWART HAWTHORNE.